INVENTORS
EDWARD PRONO
LOUIS H. SHINAULT
CAMILLE SPEISMAN

ATTORNEY

INVENTORS
EDWARD PRONO
LOUIS H. SHINAULT
CAMILLE SPEISMAN
BY
Donald W. Graves
ATTORNEY

# United States Patent Office 3,244,002
Patented Apr. 5, 1966

3,244,002
SEGMENTED BALL VALVE AND FLOWMETER
Edward Prono, Glendale, Louis H. Shinault, Granada Hills, and Camille Speisman, Tarzana, Calif., assignors to North American Aviation, Inc.
Filed May 10, 1963, Ser. No. 279,356
10 Claims. (Cl. 73—198)

The invention described herein was made in the performance of work under a NASA contract and is subject to the provisions of the National Aeronautics and Space Act of 1958, Public Law 85–568 (72 Stat. 426; 41 U.S.C. 2451), as amended.

This invention relates to valves and flowmeters.

More particularly, this invention relates to a segmented ball valve having associated therewith a flowmeter.

In those applications in which it is desirable to utilize a valve assembly in a hydraulic line and particularly where it is desired to measure the flow of fluid through the line, it has been customary to provide some sort of valve such as a ball valve or a blade valve and either upstream or downstream thereof to provide a flowmeter. While this is satisfactory in most respects, it has become increasingly necessary in certain applications such as rocket engine systems to reduce line length and weight between, for example, a tank containing propellant and the rocket engine. This invention provides a solution to the problem of excessive length and weight by combining a novel valve assembly and a flowmeter at a reduced length and weight.

This invention in its broadest aspects comprises a segmented ball valve in a fluid line. More particularly, it concerns a valve assembly wherein is located a flowmeter. The segmented ball valve has the good operating characteristics of a blade valve and a ball valve without the attendant disadvantages. In addition to the ideal operating characteristics of each type valve, the use of the segmented ball valve allows the installation of a flowmeter within the valve assembly.

It is, accordingly, an object of this invention to provide a new and improved valve assembly.

It is a more particular object of this invention to provide a new valve assembly having contained therein a flowmeter.

Figure 1:
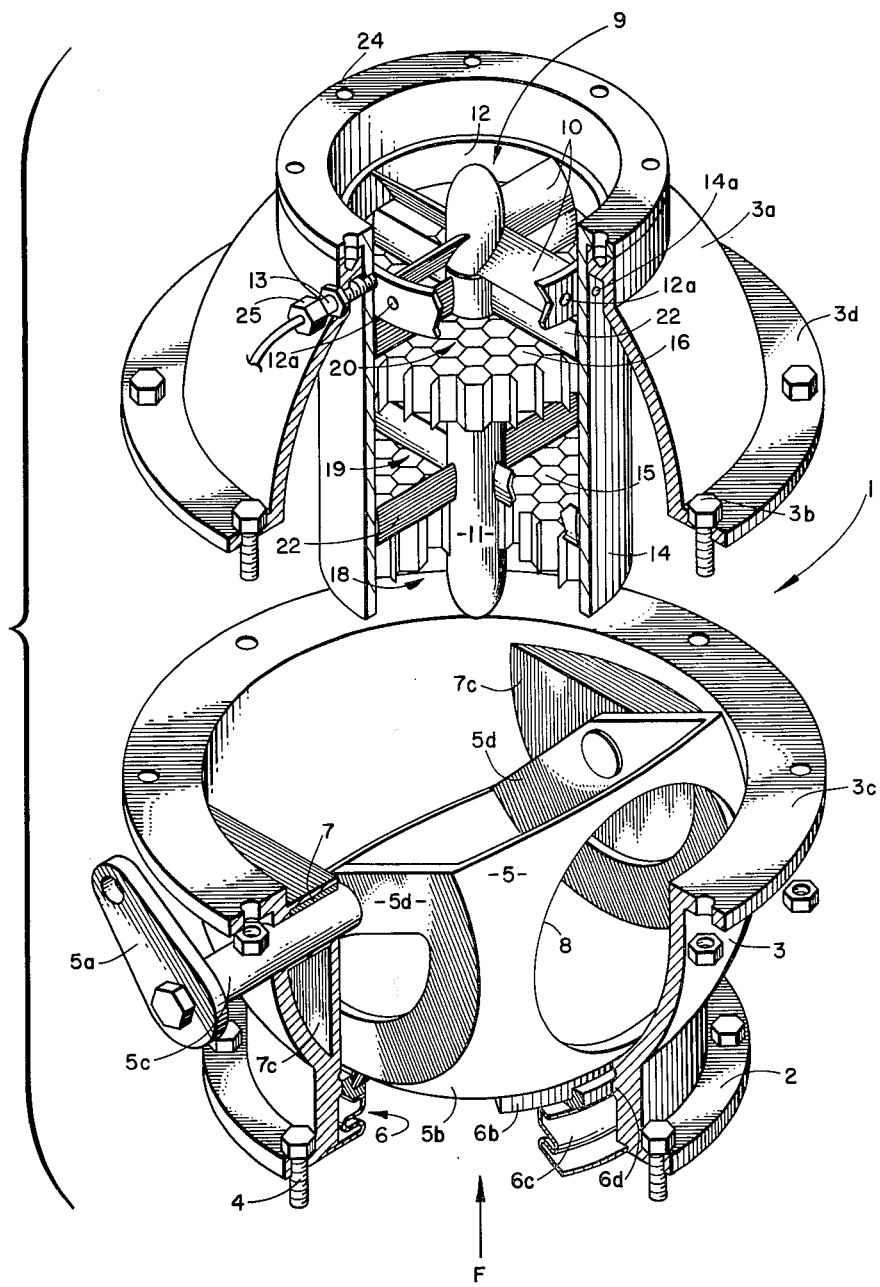
Figure 2:
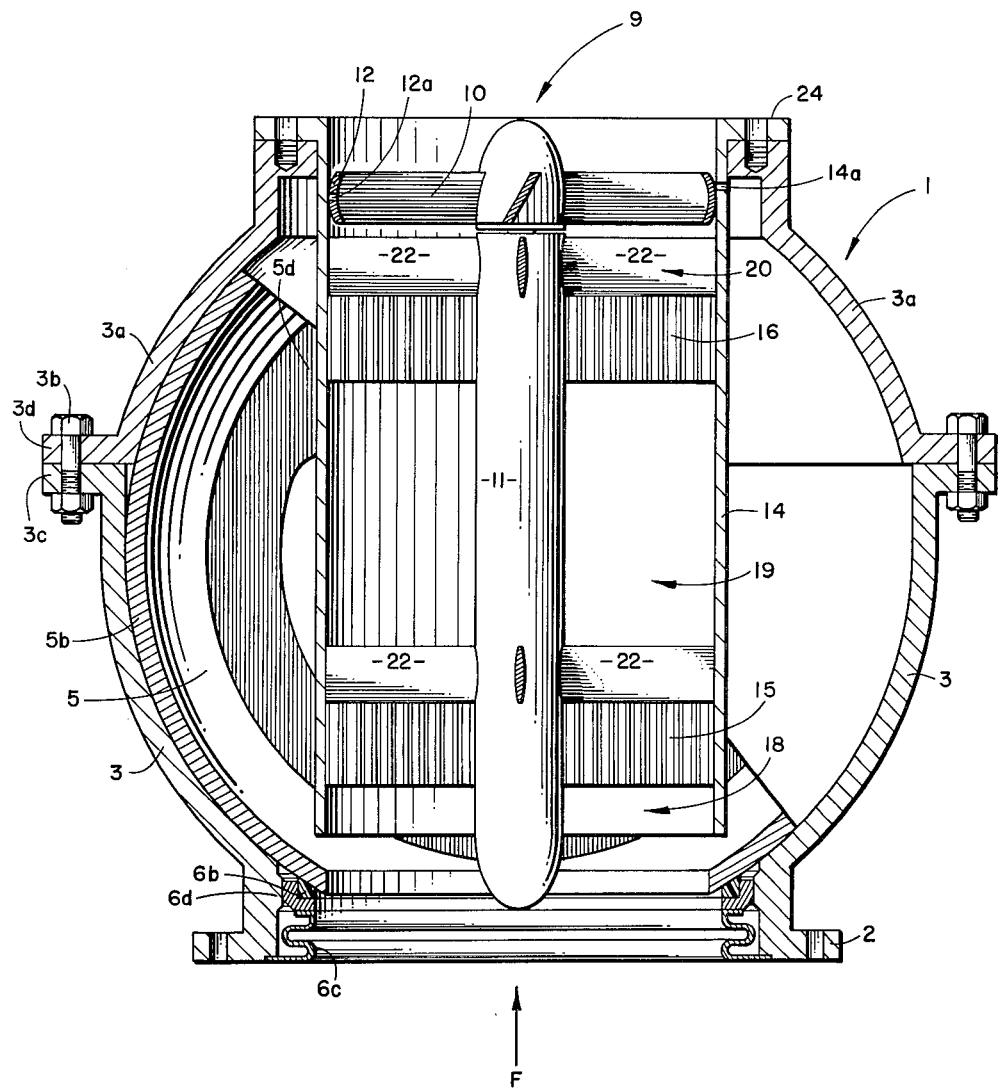

Other objects of this invention will become apparent as this description proceeds taken in conjunction with the accompanying drawings in which:

FIG. 1 is an exploded perspective view, partially in cutaway cross-section, of a segmented ball valve and flowmeter assembly, and FIG. 2 is a cross-sectional side view.

Referring now to FIG. 1, the combination valve and flowmeter assembly is indicated generally at 1. A ducting, not shown, is upstream of the valve and may be connected thereto in some manner such as by bolts 4 passing through flange 2 of cover or housing 3. This ducting would lead to a propellant tank from which propellant under pressure would be supplied. Fluid from the tank flows generally in the direction of the arrow indicated at F when the valve is opened. Cover 3 surrounds the valve assembly and is attached to cover 3a by bolt means 3b through flanges 3d and 3c. The ball valve or closure member includes a segmented ball 5 just sufficiently large to keep annular seal 6 riding on the spherical surface of the ball segment 5 at all times which avoids the wear and tear of intermittent seal contact. The segmented ball 5 is moved from opened position to closed position by an actuator such as 5a in FIG. 1. Although not shown, means such as a hydraulic actuator may be used to open the valve.

For ease of machining, the external surface 5b of the segmented ball 5 is the sealing surface which seals against seat 6b of seal 6. The internal surface of the segmented ball can be left relatively rough. This hollow, segmented ball is rotatable and is supported by arms 5d on shaft 5c in bearings 7. These bearings are supported by flat wall 7c which is a part of housing 3. Accordingly, the arms 5d are slidable relative to flat wall 7c. Although not shown, suitable seals are provided to preclude leakage past shaft 5c. Only 85° rotation is required to either fully open or fully close the valve. In FIG. 2, the segmented ball 5 is shown in a fully opened position while FIG. 1 shows the valve in a closed position. In both of these positions, the flowmeter assembly described later fits within, but does not interfere with the closure member. Thus, an aperture 8 allows the flow of fluid therethrough when aligned with the ducting. When the valve is in a closed position, as shown in FIG. 1, the opening 8 will have been rotated 85° and the portion of the ball segment which does not have an aperture therethrough will be utilized to completely close off the opening.

Seal 6 is constructed so as to conform to the surface of the segmented ball 5 at all times, regardless of structural tolerances and differences in dimensions due to temperature variations. This seal is mounted at one end to flange 2 and includes a resilient sealing portion 6b and convolutions 6c and is constructed substantially in accordance with that described in U.S. patent application Ser. No. 142,583, filed Oct. 3, 1961, assigned to the assignee of this invention. In addition, this seal provides a valuable contribution to the instant structure in that relief is provided to accommodate excessive pressures downstream of the valve. This may occur when the valve is in closed position and, for example, in the use of liquid oxygen. The oxygen may undergo a boil-off which would cause a pressure differential between the downstream side (exterior of seal) and the upstream side of the valve (interior of seal) with the pressure downstream greater than upstream. The seal 6 is constructed so that normally it is biased to seal against ball segment 5. When this reverse differential pressure of, for example, 75 p.s.i. maximum builds up, the seal will lift to vent the boil-off back to the tank. Thus, the seal is normally biased to internal pressure so that increasing internal pressure will result in higher unit load between the seal and the segmented ball. However, when the ball is in closed position and pressure downstream is greater by 75 p.s.i. pressure on the outside of the seal 6 will lift the seal off the segmented valve to vent the boil-off back into the upstream duct. Lands 6d are provided to guide and align the seal. These may alternate with grooves not shown to allow pressure to be exerted on the exterior of the seal due to the boil-off. Apertures 14a are provided in frame 14 to allow escape of fluid from the space between frame 14 and cover 3 and 3a. This is particularly convenient when the assembly is removed to prevent accumulation in the space. While seal 6 is preferably constructed as shown, annular flapper seals could be used, particularly on smaller valves. In any event, it is desirable to provide an effective seal while allowing a vent in event of excessive downstream pressure.

The use of the segmented ball reduces forces to the level of the forces required to actuate a blade valve since the dynamic reaction flow acts only on the edge of the segment of the ball instead of acting on the full diameter of the ball as in the case of a conventional ball valve. However, a pivoted blade valve is difficult to seal and requires heavy walls to keep deformation within acceptable limits. A slidable blade valve has the disadvantage of requiring more room to accommodate the blade in open position. However, a ball valve is relatively easy to seal adequately. Hence, the segmented ball concept combines the good features of the blade valve and a ball valve without paying the penalty inherent to each of these types.

As an important adjunct to this invention, another advantage of the segmented ball valve is to allow a flowmeter to be confined within the space required for a ball valve alone. For example, with this invention a length of less than 28 inches is required by a 16 inch diameter valve to accommodate the valve and the flowmeter together, while for the same case, 51 inches is required by, for example, a butterfly valve and flowmeter. In such applications as a butterfly valve, this increased length is brought about by the need for flow straighteners at least two pipe diameters long to smooth out the flow of fluid disturbed by the butterfly valve. For that matter, only two types of valves do not disturb the flow of fluid—the ball valve and the blade valve. By combining the good features of both, the shortening of over-all length results in considerable weight saving and consequently in a sizable payload increase for such applications as missiles.

In summary, the segmented ball valve reduces the actuating force to the level of a blade valve, has the dynamic reaction characteristics of a blade valve and has the good sealing characteristics of a ball valve. Also, the flowmeter is confined within the space required for a ball valve alone without requiring a movable or rotatable flowmeter which causes large errors during transient conditions and allows the flowmeter to be removed for repair without disturbing the valve. Finally, the length of flow straighteners is lessened by the use of the desirable characteristics of the ball and blade valves.

Illustrated in the embodiment shown in FIG. 1 is a turbine type flowmeter indicated generally at 9. This is an axial-flow turbine type flowmeter which per se does not form a part of this invention. When there is flow through the valves, blades 10 cause the flowmeter 9 to rotate within the shaft 11. On the periphery of these blades 10 is a shroud ring 12 made of a magnetic material. Through this shroud ring 12 are apertures 12a. A pick-up coil is indicated generally at 13 (FIG. 1) and it is located adjacent frame member 14 which has contained therein the flowmeter. This pick-up coil is pulsed upon rotation of the shroud ring and the apertures 12a as they pass the pick-up coil. This location of the pick-up coil is desirable since it makes the coil accessible and easily exchanged and eliminates the need for a pressure seal. As an alternative, the shroud ring, instead of having apertures, may have magnetic material placed thereon which would pulse the coil. The shroud ring would be made of a nonmagnetic material.

Ideally, the fluid flow through the flowmeter rotor should be purely axial and uniformly distributed. To insure this uniform distribution of flow, flow straighteners are preferably incorporated. In this embodiment, a honeycombed flow straightener 15 is located near the valve while a flow straightener 16 is located further downstream, nearer the flowmeter. A plenum space 18 is provided upstream of straightener 15, plenum 19 provided between the flow straighteners and plenum space 20 downstream of flow straightener 16. Plenum space 18 allows distribution of unequal flow created during valve opening. Plenum space 19 between the honeycomb sections allows equalization of any fluid pressure gradients which may appear at the outlet of the first section. Plenum space 20 between the last honeycomb section and the rotor provides uniform fluid distribution before entering the rotor. These plenum spaces are desirable since the honeycomb sections which are effective for removing swirl prevent radial distribution of fluid velocity. If desired, tube bundles may be provided instead of honeycombed sections. Shaft 11 which supports flowmeter 9 and straighteners 15 and 16 are suitably supported on frame 14 by braces 22.

While the flowmeter is fixed relative to the closure member 5, it is within the scope of this invention to allow the flowmeter to rotate with the closure.

In operation, with the valve in open position such as shown in FIG. 2, fluid will flow from the propellant tanks through aperture 8, flow straighteners 15 and 16 and will strike blades 10 of flowmeter 9. The flowmeter will rotate and the pulses produced by the rotation will be picked up by coil 13 and, through suitable conventional means, translated into flow measurement. The fluid will then flow through the duct on the downstream side of the valve assembly into, for example, a rocket engine injector. When it is desired to close the valve, valve arm 5a may be actuated by suitable means so as to close the valve as shown in FIG. 1. The external spherical surface 5b of the ball segment will then close off the flow. Sealing will be affectuated by seal 6. As stated previously, since the pressure on the interior of the seal is greater than on the exterior, the seal will be biased into sealing engagement. Even without this internal pressure, the seal has a normal bias into sealing engagement. In the event of a greater pressuree downstream of the ball segment such as would occur with liquid oxygen during a boil-off the valve will be subjected to pressure, which may be excessive. This greater pressure will create a pressure differential between the exterior and the interior of the seal 6. When this differential reaches a predetermined amount such as 75 p.s.i., the seal will be biased away from the ball segment, thus allowing venting of the boil-off back into the propellant tanks upstream.

When it is desirable to remove the flowmeter assembly, it can be seen that frame 14 which is an integral part with flange 24 may be simply unbolted from cover 3a and the ducting, not shown, removed as a unit. Likewise, coil 13 may be removed without interfering with the rest of the assembly by loosening nut 25.

Several advantages manifest themselves by the use of the described combination. This type of valve gives minimum pressure drop and by containing the flowmeter inside the valve will consume the least possible in-line length. Also, the necessary valve actuating force is kept to a minimum. In such application as rocket engines, the minimum pressure drop reduces propellant tank pressurization requirements and the minimum length allows the shortest possible length from the engine to the tank bottom which consequently reduces the over-all vehicle length and weight. Another advantage of this particular valve assembly is that it permits removal of the flowmeter without affecting the on-off function of the valve. When the flowmeter is removed, the valve operation is not effected and consequently the valve can be used without the flowmeter in place. Also, by utilizing one of the characteristics of the ball valve, namely, that it does not produce appreciable flow resistance, the pressure drop will not be above the normal pressure drop of the ducting it replaces.

While the illustrated embodiment of the invention has been described with particularity, it is obvious that minor deviations thereof can be made without departing from the scope of the invention.

We claim:

1. A combination valve and flowmeter assembly comprising:
   housing means,
   said housing means having an opening for entry of fluid and an opening for exit of fluid, said housing member being curved adjacent said opening for entry of fluid,
   a hollow closure member,
   said closure member being curved to conform to the curve of said housing member and movable with respect thereto and adapted to open said entry opening when in one position and to close said entry when in another position,
   flowmeter means contained within said housing,
   said flowmeter means being responsive to fluid flow through said housing so as to measure said fluid flow, said flowmeter means being located substantially within said hollow closure member.

2. A combination valve and flowmeter assembly according to claim 1 in which
said housing is substantially spherical.

3. A valve and flowmeter assembly according to claim 1 and further comprising:
flow straighteners in said housing,
said flow straighteners adapted to provide even distribution of fluid flow in said housing.

4. A valve and flowmeter assembly according to claim 1 and further comprising:
seal means to prevent flow of fluid between said housing member and said closure member when said closure member is in closed position,
said seal members being substantially annular with one portion slidable relative to said closure member,
another portion being attached to said housing,
said seal member being adapted to prevent leakage between said closure member and said housing member when said closure member is in closed position.

5. A valve according to claim 1 wherein said seal is adapted to allow flow of fluid in an upstream direction when said closure member is in closed position and the downstream fluid pressure is greater than upstream fluid pressure by a pre-determined amount.

6. A valve and flowmeter assembly according to claim 1 wherein said housing member curved portion is substantially spherical in shape and said closure member comprises a ball segment, said ball segment being slidable with respect to said housing member.

7. The invention according to claim 6 wherein said closure member is rotatable about an axis and wherein said closure member has an aperture therein which, when aligned with the opening in said housing member, allows flow of fluid therethrough and when not aligned prevents flow of fluid through said opening.

8. A valve comprising:
a housing, said housing having an opening for entry of fluid and an opening for exit of fluid,
a hollow closure member inside said housing, said closure member having an outer curved surface and adapted to move between a position to close said entry opening and a position to open said entry opening,
a seal, said seal being attached to said housing and one end thereof and slidable on said closure member and adapted to prevent flow of fluid from the upstream side of the valve to the downstream side of the valve when said closure member is in position to close said entry opening, said seal further being adapted to seal with a greater force in response to upstream pressure and to vent fluid from the downstream side of the valve to the upstream side of the valve when the downstream pressure exceeds upstream pressure by a pre-determined amount.

9. A valve comprising:
a housing having an inlet opening and an outlet opening,
a closure member for said inlet opening, said closure member being a substantially hollow partial sphere and having a spherical outer surface with a first opening adapted to align with said inlet opening and a second opening in said closure member, said second opening being substantially larger than said first opening, said first opening being located substantially closely adjacent to one side of said second opening and substantially remote from the opposite side of said second opening, said closure member being movable relative to said housing from a position to close said inlet opening to a position to open said inlet opening,
whereby said closure member is free to move from an open position to a closed position without obstructing the outlet opening of said housing.

10. A valve comprising:
a housing having an inlet opening and an outlet opening,
a structural member attached to said housing adjacent said outlet opening and extending substantially through said housing toward said inlet opening,
a closure member for said inlet opening having a curved outer surface with a first opening and a second opening therein substantially larger than said first opening, said first opening being located closely adjacent one side of said second opening and substantially remote from the opposite side from said one side, said closure member being rotatable relative to said housing on an axis at right angles to said inlet opening from a position to close said inlet opening to a position to open said inlet opening,
whereby said closure member is free to move from an open position to a closed position without interference from said structural member.

References Cited by the Examiner

UNITED STATES PATENTS

| | | | |
|---|---|---|---|
| 1,165,024 | 12/1915 | Rives | 251—351 X |
| 2,660,057 | 11/1953 | Ackley | 73—198 |
| 2,757,895 | 8/1956 | Bergstrom | 251—315 X |
| 2,837,308 | 6/1958 | Shand | 251—315 X |

RICHARD C. QUEISSER, *Primary Examiner.*